United States Patent
Neu et al.

(10) Patent No.: US 8,673,221 B2
(45) Date of Patent: Mar. 18, 2014

(54) DENITRIFICATION PLANT

(75) Inventors: Christian Neu, Bous (DE); Dirk Kiehn, Puttlingen (DE)

(73) Assignee: STEAG Power Saar GmbH, Saarbrucken (DE)

( * ) Notice: Subject to any disclaimer, the term of this patent is extended or adjusted under 35 U.S.C. 154(b) by 384 days.

(21) Appl. No.: 13/057,484

(22) PCT Filed: Oct. 11, 2008

(86) PCT No.: PCT/EP2008/008610
§ 371 (c)(1),
(2), (4) Date: Mar. 3, 2011

(87) PCT Pub. No.: WO2010/015272
PCT Pub. Date: Feb. 11, 2010

(65) Prior Publication Data
US 2011/0150709 A1    Jun. 23, 2011

(30) Foreign Application Priority Data
Aug. 4, 2008   (DE) .......................... 10 2008 036 099

(51) Int. Cl.
*G05D 7/00* (2006.01)
*B01D 50/00* (2006.01)

(52) U.S. Cl.
USPC ............ 422/111; 422/168; 422/172; 422/119

(58) Field of Classification Search
USPC .................................. 422/168, 172, 111, 119
See application file for complete search history.

(56) References Cited

U.S. PATENT DOCUMENTS

| 5,249,954 A * | 10/1993 | Allen et al. ..................... 431/14 |
| 5,478,542 A | 12/1995 | Chawla |
| 5,676,071 A | 10/1997 | Horler |
| 6,190,628 B1 | 2/2001 | Carter |
| 2004/0052693 A1 | 3/2004 | Crane et al. |
| 2005/0002841 A1 | 1/2005 | Moberg |

FOREIGN PATENT DOCUMENTS

DE   3935400   10/1989
(Continued)

OTHER PUBLICATIONS

Yingping Huang et al., On-line flicker measurement of gaseous flames by image processing and spectral analysis, Meas. Sci. Technol., 1999, 726-733, vol. 10, UK. Available from http://iopscience.iop.org/0957-0233/10/8/307.

*Primary Examiner* — Lessanework Seifu
(74) *Attorney, Agent, or Firm* — James Creighton Wray

(57) ABSTRACT

The invention relates to a device for denitrifying the flue gases of a fossil fuel-fired steam generator, especially a steam generator boiler (1) of a power plant, having apparatuses (10-12) for blowing a reagent effective in a predetermined temperature range into the interior (18) of the steam generator (1), which contains hot combustion gases. The device according to the invention is characterized in that the blow-in apparatuses (10-12) comprise a plurality of injection lances (10) arranged in spatially distributed manner and a control apparatus (13) for measuring the respective temperature distribution in the interior (18) and for selecting injection lances (10) suitable for blowing in based on the temperature distribution.

6 Claims, 1 Drawing Sheet

(56) References Cited

FOREIGN PATENT DOCUMENTS

| | | |
|---|---|---|
| DE | 4130348 | 9/1991 |
| DE | 4231777 | 9/1992 |
| DE | 19509412 | 3/1995 |
| DE | 19710206 | 3/1997 |
| EP | 0364712 | 9/1989 |
| EP | 0424893 | 10/1990 |
| EP | 1140851 | 10/2004 |
| WO | 91/06506 | 5/1991 |

* cited by examiner

DENITRIFICATION PLANT

This application claims the benefit of German Application No. 10 2008 036 099.6 filed Aug. 4, 2008 and PCT/EP2008/008610 filed Oct. 11, 2008, which are hereby incorporated by reference in their entirety as if fully set forth herein.

The invention relates to an apparatus for the denitrification of flue gases of a fossil-fired steam generator, in particular of a steam generator boiler of a power plant, with devices for injecting a reagent, active in a predetermined temperature range, into the inner space, containing hot combustion gases, of the steam generator.

To remove nitrogen oxides from the flue gases of steam generators, the SCR method, as it is known, is conventionally employed, in which ammonia is used as a reagent in a catalytic reduction process. In addition to high costs for the regeneration and reprocurement of catalyst material, this method has the disadvantage that following plants are contaminated by ammonium bisulfate. It is also not always possible, or is at least uneconomical, to utilize the ashes on account of ammonia pollution.

An alternative to the SCR method is the non-catalytic SNCR method, in which ammonia water or urea is injected directly into the inner space, containing hot combustion gases, of the steam generator. Particularly in large steam generator units of power plants, the use of this method presents difficulties, because the denitrification reaction takes place only within a relatively narrow temperature window of between 880° C. and 1040° C., but the spatial temperature distribution in large steam generator units changes sharply as a function of the operating conditions of the latter. Depending on the operating conditions, therefore, the injection of the reagent may be ineffective because of the absence of the temperature window. In addition to insufficient denitrification, reagent residues also have the disadvantage of preventing the ash from being marketed.

The object on which the invention is based is to improve the possibilities for using the SNCR method, particularly for large steam generator units of power plants.

This object is achieved by means of an apparatus of the type initially mentioned, which is characterized in that the injection devices comprise a multiplicity of injection lances arranged in a spatial distribution, and also a control device for determining the respective temperature distribution in the inner space and for selecting suitable injection lances for injection on the basis of the temperature distribution.

Stable denitrification is advantageously achieved by this inventive solution at any time independently of the respective operating conditions of the steam generator, in particular independently of the load and of the type of fuel. The ashes which are free of residues of unspent reagent can be utilized unrestrictedly.

While the control device could detect the spatial temperature distribution in the boiler inner space by sensors, in a preferred embodiment of the invention the control device is provided for indirectly determining the temperature distribution on the basis of at least one operating parameter, critical for the temperature distribution, of the steam generator. Such an operating parameter can advantageously be determined at a markedly lower outlay than required when the temperature is measured directly at a plurality of locations in the hot combustion gases.

In particular, the control device may be provided for indirectly determining the temperature distribution on the basis of the load of the steam generator, the type of fuel used and/or at least one parameter characteristic of the burner flames of the steam generator.

The control device may have a memory in which the respective temperature distributions are stored, as a table, in relation to the particular operating parameters. The control device can thus determine the associated temperature distribution indirectly from a measured operating parameter value.

In an especially preferred embodiment of the invention, the control device comprises an image sensor at least partially detecting the burner flames and also an image evaluation device.

In particular, the image sensor detects a flickering region of a burner flame or of a plurality of burner flames, and the image evaluation device is preferably provided for determining the flicker frequency as an operating parameter critical for the respective temperature distribution.

It became apparent that the flicker frequency alone is critical for the temperature distribution over wide ranges, that is to say there is a virtually unequivocal relationship between the flicker frequency values and the respective temperature distribution. In the preferred embodiment of the invention, therefore, the control device is provided for determining the flicker frequency as the sole operating parameter, the control device, where appropriate, determining the average value of the flicker frequencies over all the burner flames of the steam generator.

The control device expediently comprises an adaptive memory system provided for adding to the look-up tables, the use of neuronal networks coming under particular consideration here.

The invention is explained below with reference to an exemplary embodiment and to the accompanying drawings which relate to this exemplary embodiment and in which:

DETAILED DESCRIPTION OF THE PREFERRED EMBODIMENTS

Figure 1:
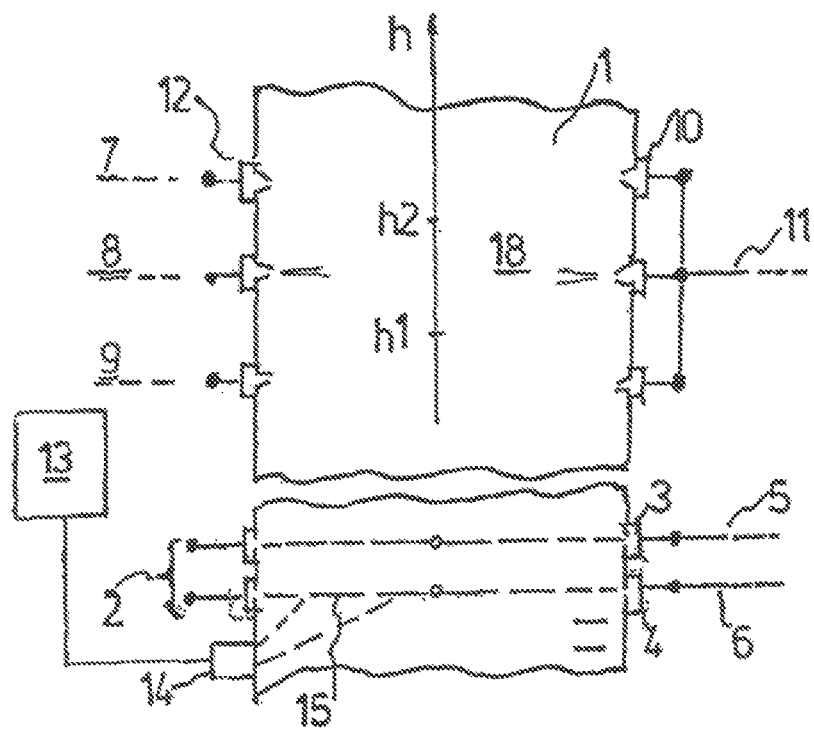
FIG. 1 shows a diagrammatic illustration of a steam generator equipped with an apparatus according to the invention.

A steam generator boiler 1, a detail of which is illustrated in FIG. 1 and which is equipped with a denitrification apparatus, has an uppermost burner plane 2 with inlets 3 and 4 for a fuel/air mixture and for combustion air respectively. In the example shown, overall, four inlets 3 and four inlets 4 are provided in the burner plane 2 and lie diametrically opposite one another in pairs. Lines 5 and 6 ensure that the fuel/air mixture and the combustion air are delivered.

Above the uppermost burner plane 2, injection lances 10 for injecting a reagent delivered via a line 11 are provided in three different planes 7 to 9 on the steam generator boiler 1, of which pipes carrying water to be evaporated are not shown for the sake of simplicity. The reagent is preferably ammonia water or urea. Each plane accommodates, overall, four of the lances 10 which lie diametrically opposite one another in pairs. All the injection lances 10 have an activatable stop valve 12.

A control device comprises a central control unit 13, by which each individual stop valve 12 can be activated and which is connected to an image sensor 14 detecting an image cutout 15 of the burner flame.

The functioning of the above-described denitrification apparatus is explained below with reference to FIG. 2.

When the steam generator boiler 1 is in operation, said reagent is constantly injected via the injection lances 10 into the hot combustion gases flowing through the inner space 18 of the steam generator boiler 1, reduction of the nitrogen oxides contained in the combustion gases taking place.

The reagent is active only in a temperature range of between T2=1100° C. and T1=900° C. The control unit 13, by the appropriate activation of the stop valves 12, selects from the multiplicity of injection lances 10, present overall, only those which inject into a region of the inner space 18 in which the temperature of the combustion gases lies between T1 and T2. So that this selection can be made, the control unit 13 determines the respective spatial distribution of the temperature T in the inner space 18 of the steam generator boiler 1.

Figure 2:
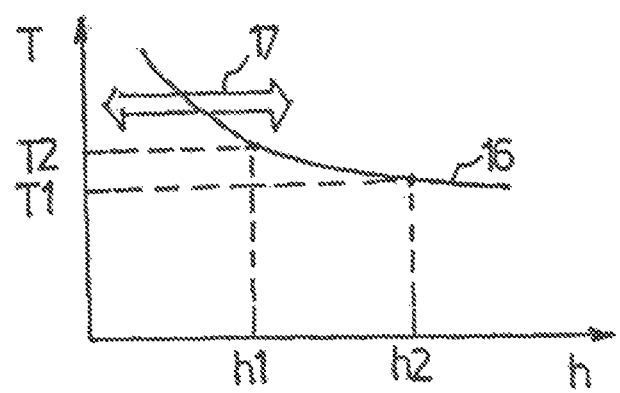
FIG. 2 shows an illustration explaining the functioning of the apparatus of FIG. 1.

In very approximate terms, for given operating conditions, the temperature T in the steam generator boiler 1 is solely a function of the height h, as illustrated in FIG. 2, for example, by the curve T=f(h) shown. If the operating conditions change, in particular the load and/or the type of fuel used, the curve T=f(h) shifts according to the double arrow 17 toward higher or lower values of h.

Changes in the operating conditions lead to detectable changes in the behavior of the burner flames.

The image sensor 14 detects an image cutout 15 in which the burner flame flickers. The flicker frequency is dependent on the operating conditions, in particular on the load and/or on the type of fuel. A specific temperature distribution function T=f(h) can, in turn, be assigned to the various flicker frequency values and can be stored as a table in the control unit 13 in relation to the flicker frequency values.

An image evaluation device in the control unit 13 determines the respective flicker frequency from the signal of the image sensor 14. The control unit 13 then assigns the corresponding temperature distribution to this frequency by means of the stored tables and, on the basis of the temperature distribution determined, selects the injection lances 10 suitable in each case for injection. In the example shown in FIG. 1, a height region between h2 and h1 is obtained for the effective temperature range T1 and T2, and therefore the control unit 13 selects the injection lances 10 only of the plane 8.

Image sensors corresponding to the image sensor 14 will be accommodated in each burner plane. The control unit 13 determines the average value from all the measured flicker frequencies and then, on the basis of the average value, the particular temperature distribution.

The invention claimed is:

1. An apparatus for denitrification of flue gases of a fossil-fired steam generator, in particular of a steam generator boiler of a power plant, with devices (10-12) for injecting a reagent, active in a predetermined temperature range, into an inner space (18) of the steam generator (1) containing hot combustion gases, wherein the injection devices (10-12) comprise a multiplicity of injection lances (10) arranged in a spatial distribution, and also a control device (12-14) for determining the respective temperature distribution (16) in the inner space (18) and for selecting suitable injection lances (10) for injection on the basis of the temperature distribution (16), and wherein the control device (12-14) is provided for indirectly determining the temperature distribution (16) in the inner space (18) on the basis of at least one operating parameter of the steam generator (1) which is critical for the temperature distribution, wherein the control device (12-14) comprises an image sensor (14) detecting a flickering region (15) of at least one of the burner flames and an image evaluation device and wherein the control device (12-14) is provided for indirectly determining the temperature distribution (16) in the inner space (18) on the basis of the flicker frequency as an operating parameter critical for the respective temperature distribution (16).

2. The apparatus as claimed in claim 1, wherein the control device (12-14) is further provided for indirectly determining the temperature distribution (16) on the basis of the load of the steam generator and/or the type of fuel used.

3. The apparatus as claimed in claim 1, wherein the control device (12-14) comprises a memory in which the respective temperature distributions (16) are stored, where appropriate as a table, in relation to the particular operating parameter values.

4. The apparatus as claimed in claim 1, wherein the control device is provided for determining the flicker frequency as the sole operating parameter.

5. The apparatus as claimed in claim 1, wherein the control device is provided for determining a flicker frequency value averaged over the various burner planes of the steam generator.

6. The apparatus as claimed in claim 1, wherein the control device comprises an adaptive memory system, in particular a neuronal network, provided for adding to the memory content.

* * * * *